(12) United States Patent
Krits et al.

(10) Patent No.: US 12,436,788 B2
(45) Date of Patent: Oct. 7, 2025

(54) EFFICIENT MASS VIRTUAL MACHINE (VM) CLONING

(71) Applicant: VMware LLC, Palo Alto, CA (US)

(72) Inventors: Alexander Krits, Austin, TX (US); Pavan Narasimhaprasad, Cedar Park, TX (US); Li Zheng, Palo Alto, CA (US); Ali Reza Alibhai, Richmond Hill (CA); Arunachalam Ramanathan, Union City, CA (US); Sampath Kumar Kilaparthi, San Jose, CA (US); Nathan Lyle Prziborowski, Eugene, OR (US)

(73) Assignee: VMware LLC, Palo Alto, CA (US)

( * ) Notice: Subject to any disclaimer, the term of this patent is extended or adjusted under 35 U.S.C. 154(b) by 750 days.

(21) Appl. No.: 17/574,453

(22) Filed: Jan. 12, 2022

(65) Prior Publication Data

US 2023/0221977 A1    Jul. 13, 2023

(51) Int. Cl.
 *G06F 9/455* (2018.01)
(52) U.S. Cl.
 CPC ........... *G06F 9/45558* (2013.01); *G06F 2009/45562* (2013.01); *G06F 2009/45583* (2013.01); *G06F 2009/45595* (2013.01)
(58) Field of Classification Search
 CPC ........ G06F 9/45558; G06F 9/5077; G06F 2009/45562; G06F 2009/45595; G06F 2009/4557
 See application file for complete search history.

(56) References Cited

U.S. PATENT DOCUMENTS

| | | | | |
|---|---|---|---|---|
| 8,176,486 | B2 * | 5/2012 | Amir Husain | H04L 67/34 718/1 |
| 8,443,365 | B2 * | 5/2013 | Kumar | G06F 9/45558 718/1 |
| 9,268,610 | B2 * | 2/2016 | Hegdal | H04L 67/34 |
| 9,329,889 | B2 * | 5/2016 | Lin | G06F 9/45558 |
| 9,424,065 | B2 * | 8/2016 | Singh | G06F 3/0482 |
| 10,698,709 | B2 * | 6/2020 | Korbar | G06N 5/02 |
| 11,500,802 | B1 * | 11/2022 | Xu | G06F 15/17318 |

OTHER PUBLICATIONS

Horacio Andrés Lagar-Cavilla et al. 2009. SnowFlock: rapid virtual machine cloning for cloud computing. In Proceedings of the 4th ACM European conference on Computer systems (EuroSys '09). Association for Computing Machinery, New York, NY, USA, pp. 6-7 (Year: 2009).*

\* cited by examiner

*Primary Examiner* — Lewis A Bullock, Jr.
*Assistant Examiner* — John Robert Dakita Ewald
(74) *Attorney, Agent, or Firm* — Quarles & Brady LLP (57) ABSTRACT

In one set of embodiments, during an initial pre-copying phase, copies of the virtual disks of a VM or VM template can be distributed across one or more datastores, prior to the start of any cloning. This effectively seeds each datastore with a disk pool comprising a certain number of copies of the VM/VM template's virtual disks. Then, at the time of receiving a user request to create k clones from the VM/VM template, up to k copies of the VM/VM template's virtual disks that already reside in the disk pools of one or more target datastores can be moved from those disk pools to the clones' home folders on the target datastores, thereby reducing or eliminating the need to create brand new copies of the virtual disks on demand.

15 Claims, 4 Drawing Sheets

EFFICIENT MASS VIRTUAL MACHINE (VM) CLONING

BACKGROUND

Unless otherwise indicated, the subject matter described in this section is not prior art to the claims of the present application and is not admitted as being prior art by inclusion in this section.

Virtual machine (VM) cloning is a VM provisioning operation that creates, from an existing VM or VM template, a new VM (i.e., clone) that is an identical and independent copy of the original. This cloning process includes creating copies of the existing VM/VM template's virtual disks for use by the clone.

In some virtual infrastructure deployments, several clones are created from a single VM/VM template at a time (referred to herein as mass cloning). However, due to the way in which VM cloning is currently implemented and the need to create separate virtual disk copies for each clone, mass cloning can take a long time to complete.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for mass cloning VMs from an existing VM/VM template in an efficient manner. In one set of embodiments, during an initial pre-copying phase, copies of the virtual disks of the VM/VM template can be distributed (or in other words, pre-copied) across one or more datastores, prior to the start of any cloning. This pre-copying effectively seeds each datastore with a disk pool comprising a certain number of copies of the VM/VM template's virtual disks.

Then, at the time of receiving a user request to create k clones from the VM/VM template, up to k copies of the VM/VM template's virtual disks that already reside in the disk pools of one or more target datastores can be moved from those disk pools to the clones' home folders on the target datastores. Accordingly, this approach reduces or eliminates the need to create brand new copies of the virtual disks at the target datastores on demand (i.e., upon receiving the clone request), thereby significantly reducing the time needed to complete the request. These and other aspects are described in further detail below.

2. Example Environment and Solution Architecture

Figure 1:
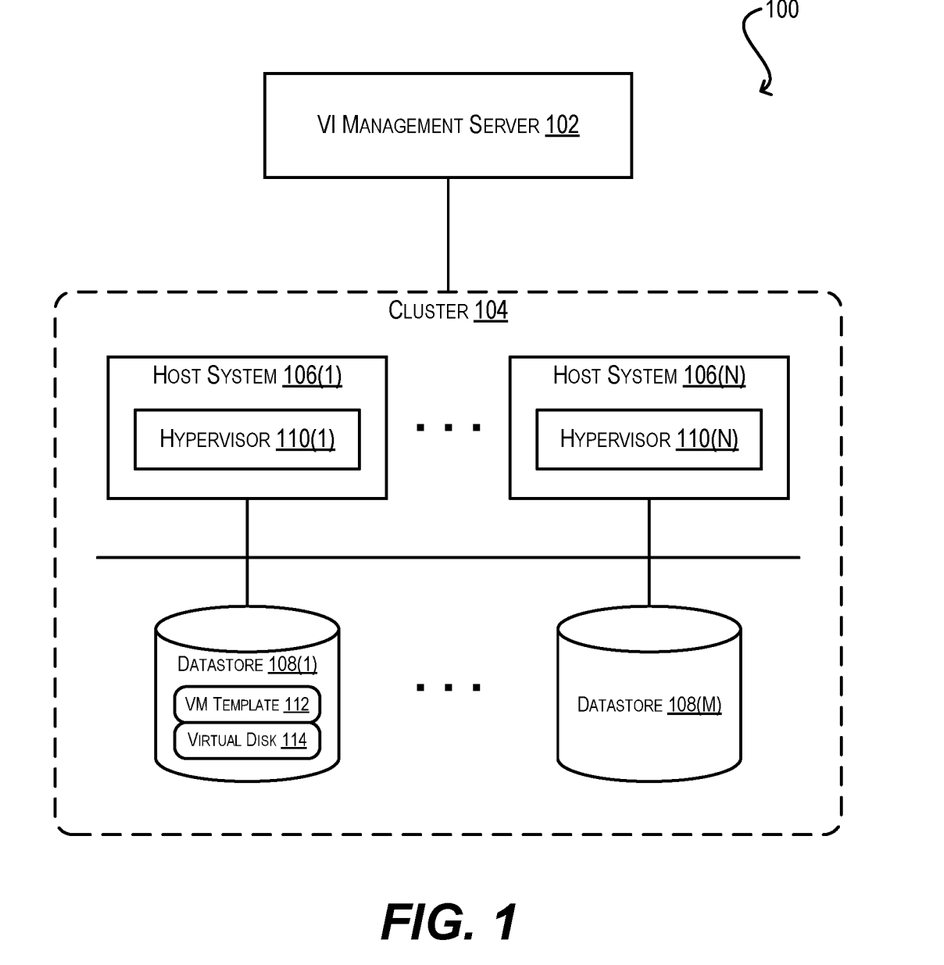
FIG. 1 depicts an example environment.

FIG. 1 depicts an example environment 100 in which embodiments of the present disclosure may be implemented. As shown, environment 100 includes a virtual infrastructure (VI) management server 102 that is communicatively coupled with a cluster 104 comprising a plurality of host systems 106(1)-(N) and a plurality of datastores 108(1)-(M). VI management server 102 is a software component, such as VMware's vCenter Server, that is configured to manage the operation and lifecycles of the entities in cluster 104. Each host system 106 is a physical machine comprising a hypervisor 110 that provides an environment in which one or more VMs may run. Each hypervisor 110 may be a bare metal hypervisor, hosted hypervisor, or any other type of hypervisor known in the art. And each datastore 108 is a logical storage container or repository that holds the persistent data of one or more VMs running on host systems 106(1)-(N), including virtual disk files. Datastores 108(1)-(M) may reside on standalone storage arrays/servers or on local storage devices of host systems 106(1)-(N) (e.g., locally-attached magnetic disks, solid state disks, etc.). The latter will typically be the case if cluster 104 is hyper-converged infrastructure (HCI) cluster.

In addition to host systems 106(1)-(N) and datastores 108(1)-(M), cluster 104 includes a VM template 112 residing on one of the datastores (i.e., datastore 108(1)). A VM template is an image of a VM that includes the VM's configuration/settings and one or more virtual disks (e.g., virtual disk 114 shown in FIG. 1), but cannot be powered on like a conventional VM. Accordingly, VM templates are generally defined for the purpose of creating clones. Once a clone has been created from a VM template, the clone is a fully independent VM with its own set of virtual disks, settings, and so on that have been copied from the template.

As noted in the Background section, it is not uncommon for multiple VMs to be mass cloned from a VM or VM template like VM template 112 of FIG. 1. For example, in a virtual desktop infrastructure (VDI) deployment, tens or hundreds of clones may be created as a batch from a single "golden" VM template that specifies the deployment's standard virtual desktop environment. Unfortunately, this is a time-consuming process for several reasons. First, in existing implementations the creation of multiple clones is handled as a set of single clone requests, each of which is processed independently. Second, separate copies of the virtual disks of the source VM/VM template must be created for each clone and transferred to the datastores where the clones reside. Third, in many cases a static resource reservation cap is imposed on each host system that limits the number of concurrent clone requests that can be processed by the host system at a time.

Figure 2:
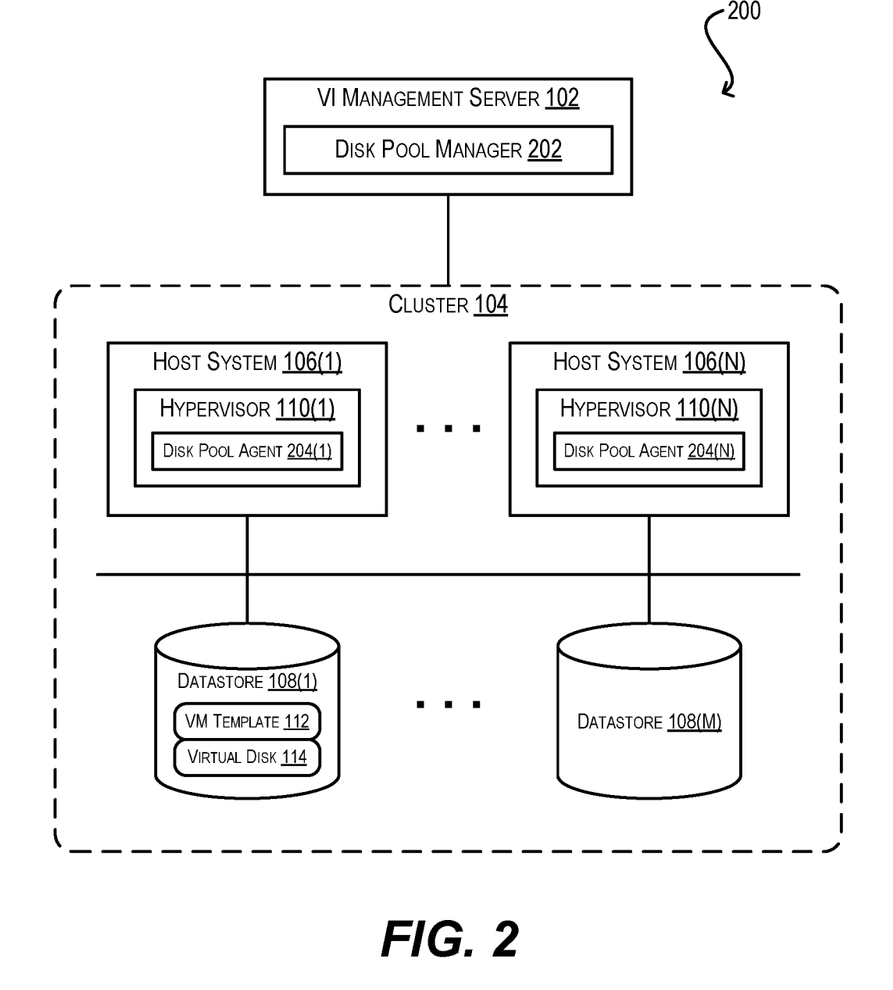
FIG. 2 depicts an enhanced version of the environment of FIG. 1 according to certain embodiments.

To address the foregoing and other related issues, FIG. 2 depicts an enhanced version of environment 100 of FIG. 1 (i.e., environment 200) comprising a novel disk pool manager 202 in VI management server 102 and novel disk pool agent 204 in hypervisor 110 of each host system 106. In various embodiments, these new components can work in concert to enable the mass cloning of VMs from VM template 112 in a more efficient and rapid manner.

For example, as part of an initial pre-copying workflow (detailed in section (3) below), disk pool manager 202 can receive a request to register VM template 112 as a source template for future VM cloning operations. This registration request can include a content distribution policy specifying that a certain number of copies of VM template 112's virtual disk(s) (i.e., virtual disk 114) should be pre-copied on certain destination datastores of cluster 104. For example, the content distribution policy can specify, among other things, identifiers (IDs) of the destination datastores and the number of copies of virtual disk 114 to be created on each destination datastore. Each copy of virtual disk 114 that is created via this process is referred to herein as a "pre-copied disk" and the set of pre-copied disks that is created on a given destination datastore is referred to herein as the "disk pool" for that datastore.

Upon receiving the registration request, disk pool manager 202 can identify host systems in cluster 104 that have access to the destination datastores and can orchestrate the transfer of a single "seed" copy of virtual disk 114 from its current storage location (i.e., datastore 108(1)) to each identified host system. The disk pool agent on each receiving host system can subsequently store the seed copy on its accessible datastore(s) and can locally create additional copies of virtual disk 114 on those datastore(s) from the seed copy in order to reach the desired count of pre-copied disks (i.e., disk pool size) per the content distribution policy.

Then, as part of a mass cloning workflow (detailed in section (4) below), VI management server 102 can receive a request to clone multiple VMs from VM template 112. In response, disk pool manager 202 can provide to VI management server 102 information regarding the pre-copied disks that were previously distributed across datastores 108(1)-(M) via the pre-copying workflow, and VI management server 102 can thereafter send clone command(s) to one or more host systems in order to create the clones on one or more target datastores, with instructions to use the existing pre-copied disks on those target datastore(s) (rather than creating brand new copies). Finally, upon receiving the clone command, the disk pool agent on each receiving host system can simply move an appropriate number of pre-copied disks out of the disk pool of each target datastore and into the VM home folders of the newly created (or to-be-created) clones to fulfill the clone request.

With the high-level approach above, several advantages are realized. For example, assuming there is a sufficient number of pre-copied disks at the target datastore(s) to accommodate the clone request, this approach avoids the need to copy any virtual disk data at the time of cloning. And even if there are not enough pre-copied disks, this approach reduces the number of new virtual disk copies that need to be created. Accordingly, one of the major contributors to the overall time need to complete the mass cloning is mitigated/eliminated. In certain embodiments, additional optimizations can be implemented to efficiently distribute the initial seed copies of virtual disk 114 to the host systems and to create local copies from the seed copy at each destination datastore. These optimizations are discussed in sections (3) and (4) below.

In addition, this approach allows users to clone multiple VMs via a single mass clone request and allows VI management server 102 and host systems 106(1)-(N) to process the multiple clone operations as a group, allowing for greater concurrency than existing implementations.

It should be appreciated that FIGS. 1 and 2 are illustrative and not intended to limit embodiments of the present disclosure. For example, although these figures depict a single cluster 104 within environment 100/200, in alternative embodiments VI management server 102 may manage multiple clusters, each with its own set of host systems and datastores. In these embodiments, disk pool manager 202 may be configured to orchestrate the pre-copying of virtual disk 114 across the datastores of the multiple clusters.

Further, although VM template 112 is assumed to have a single virtual disk 114 for ease of explanation, the techniques described herein are equally applicable to VM templates with multiple virtual disks.

Yet further, although disk pool agents 204(1)-(N) are shown as residing on host systems 106(1)-(N), in some embodiments these disk pool agents may run on other machines within cluster 104 that have access to datastores 108(1)-(M). For example, if the datastores are hosted on standalone storage arrays or storage servers, disk pool agents 204(1)-(N) may run on these storage arrays/servers. One of ordinary skill in the art will recognize other variations, modifications, and alternatives.

3. Pre-Copying Workflow

Figure 3:
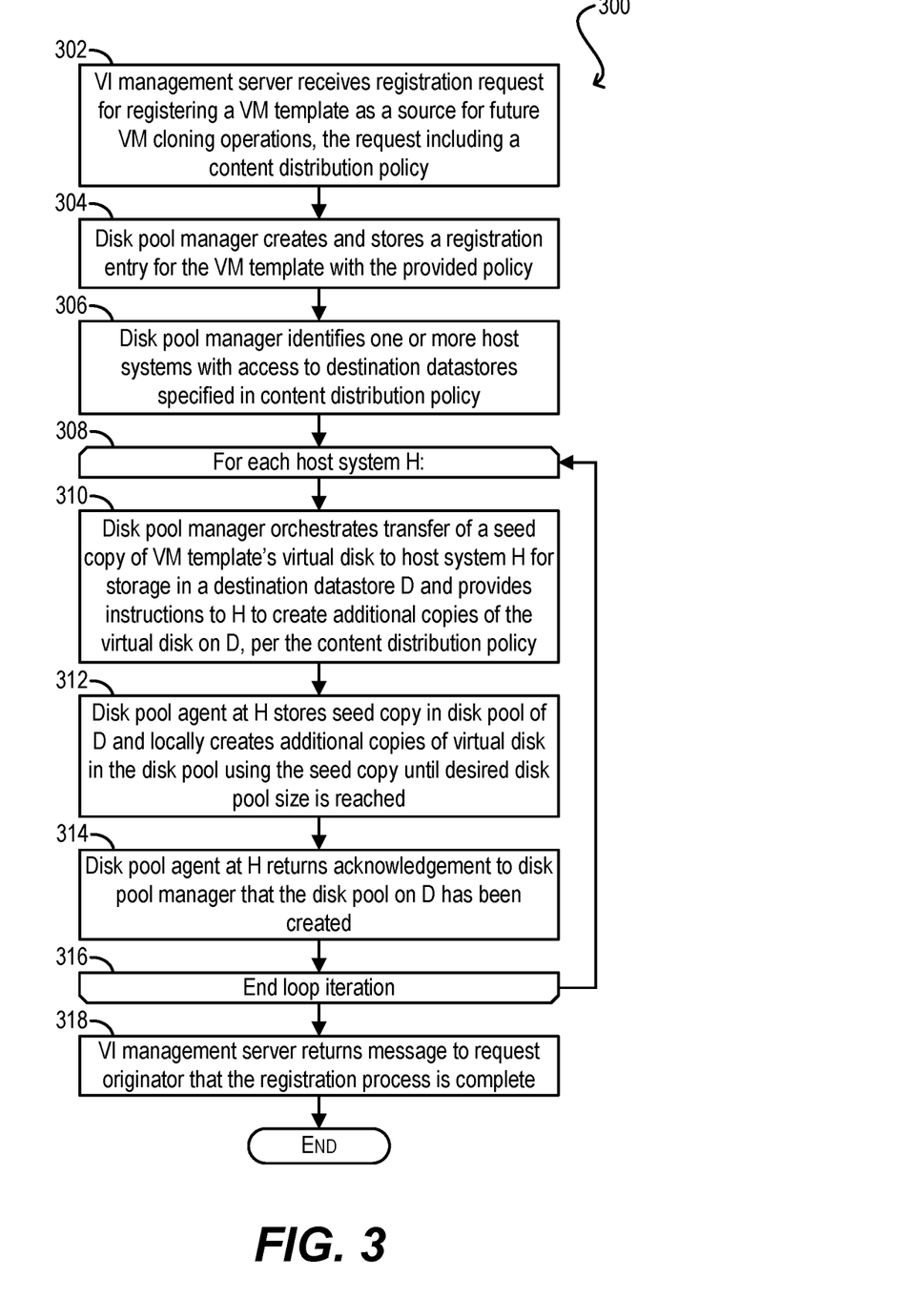
FIG. 3 depicts a pre-copying workflow according to certain embodiments.

FIG. 3 depicts a flowchart 300 of the pre-copying workflow that may be executed by VI management server 102/disk pool manager 202 and host systems 106(1)-(N)/disk pool agents 204(1)-(N) of FIG. 2 according to certain embodiments.

Starting with block 302, VI management server 102 can receive (from, e.g., a user of environment 200) a registration request for registering VM template 112 as a template that will be used for future (mass) VM cloning operations. As mentioned previously, this registration request can include a content distribution policy that specifies one or more destination datastores of cluster 104 where virtual disk 114 should be pre-copied and the number of pre-copied disks to be created in the disk pool of each destination datastore. In certain embodiments, the content distribution policy can also specify a minimum threshold number of pre-copied disks to be maintained in the disk pool of each destination datastore.

At block 304, disk pool manager 202 can create and store a registration entry for VM template 112 with the provided content distribution policy. In addition, disk pool manager 202 can identify one or more host systems with access to the specified destination datastores (block 306).

At block 308, disk pool manager 202 can enter a loop for each host system H identified at block 306. Within this loop, disk pool manager 202 can orchestrate the transfer of an initial seed copy of VM template 112's virtual disk(s) (i.e., virtual disk 114) from its storage location (i.e., datastore 108(1)) to host system H for storage in at least one destination datastore D accessible by H and can instruct H to create additional copies of virtual disk 114 in D per the content distribution policy received at block 302 (block 310). For example, if the content distribution policy specifies that destination datastore D should have five copies of virtual disk 114, disk pool manager 202 can provide instructions to host system H to create four additional copies (beyond the initial seed copy).

At block 312, the disk pool agent at host system H can receive the seed copy of virtual disk 114, store the seed copy in the disk pool of destination datastore D, and locally create additional copies of virtual disk 114 in the disk pool using the seed copy until the desired disk pool size is reached. The disk pool agent can thereafter return an acknowledgement to disk pool manager 202 that the disk pool has been created on destination datastore D (block 314) and the end of the current loop iteration can be reached (block 316).

Finally, upon receiving disk pool creation acknowledgements from all of the host systems identified at block 306, disk pool manager 202 can notify VI management server 102, which can return a message to the request originator that the registration of VM template 112 is complete (block 318).

It should be noted that although blocks 308-316 of flowchart 300 are shown as being performed in a sequential loop for each host system H for ease of illustration, in certain embodiments these steps may be performed in parallel across all of the identified host systems. In these embodiments, disk pool manager 202 can implement a "read-once" optimization that involves reading the data content of virtual disk 114 a single time from source datastore 108(1) and then transferring the seed copies to the various host systems by splitting/replicating the read data blocks. This advantageously avoids the time and I/O overhead of re-reading virtual disk 114 from datastore 108(1) for every seed copy transfer.

In addition, in some embodiments disk pool manager 202 may employ a further "multicast optimization" that involves using a network multicast protocol (such as IP multicast) to send out a single copy of virtual disk 114 over the network to the identified host systems (rather than issuing a separate network transmission to each host system). The network multicast protocol can then take care of replicating the single transmitted copy as needed in order to reach the destination host systems, thereby reducing the network bandwidth required for this process.

4. Mass Cloning Workflow

Figure 4:
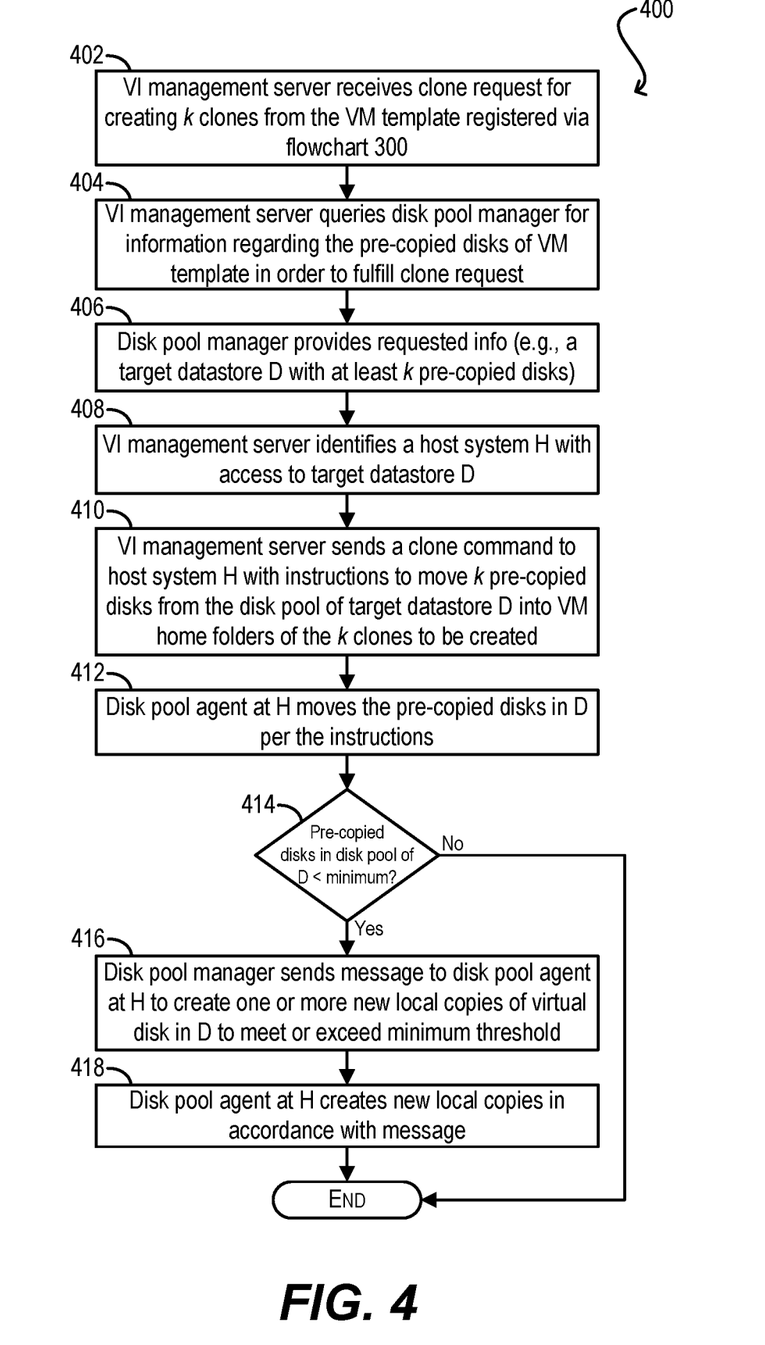
FIG. 4 depicts a mass cloning workflow according to certain embodiments.

FIG. 4 depicts a flowchart 400 of the mass cloning workflow that may be executed by VI management server 102/disk pool manager 202 and host systems 106(1)-(N)/disk pool agents 204(1)-(N) of FIG. 2 according to certain embodiments. Flowchart 400 assumes that VM template 112 has been registered with disk pool manager 202 and its virtual disk 114 has been pre-copied to one or more destination datastores of cluster 104 per flowchart 300 of FIG. 3.

Starting block 402, VI management server 102 can receive a clone request (from, e.g., a user of environment 200) for creating multiple (i.e., k) VM clones from VM template 112. For this flowchart, it is assumed that the clone request simply specifies the desired number of clones (and source VM template 112) and leaves it to VI management server 102 to determine appropriate datastore placements for the clones. However, in alternative embodiments, the clone request may identify a particular datastore (or set of datastores) on which on the k clones should be created.

At block 404, VI management server 102 can query disk pool manager 202 for information regarding the pre-copied disks of VM template 112 in order to fulfill the clone request received at 402. For example, VI management server 102 can query disk pool manager 202 for one or more datastores that collectively have k copies of virtual disk 114 in its disk pool(s).

In response, disk pool manager 202 can provide the requested information, such as the ID of a target datastore D with at least k pre-copied disks (block 406), and VI management server 102 can identify a host system H that has access to target datastore D (block 408).

At block 410, VI management server 102 can send a clone command to host system H with instructions to move k pre-copied disks from the disk pool of target datastore D into the VM home folders of the k clones to be created. These VM home folders are storage locations on target datastore D where the clones' persistent data will be maintained.

At block 412, the disk pool agent of host system H can receive the clone command and execute the move operation in accordance with the instructions. Although not shown, VI management server 102 and host system H can then proceed with any further steps needed to create the k clones on target datastore D.

Upon completion of the foregoing, disk pool manager 202 can check whether the number of pre-copied disks in the disk pool of target datastore D has now fallen between the minimum threshold number specified in the content distribution policy for VM template 112 (block 414). If the answer is yes, disk pool manager 202 can send a message to the disk pool agent of host system H to create one or more new local copies of virtual disk 114 at target datastore D in order to meet or exceed the minimum threshold (block 416), and the disk pool agent can create the new local copies in accordance with the message (block 418). Finally, if the answer at block 414 is no (or upon completion of block 418), flowchart 400 can end.

It should be noted that flowchart 400 assumes target datastore D has a sufficient number of pre-copied disks in its disk pool (i.e., k) in order to fulfill the clone request received at block 402. However, in some scenarios this may not be the case. For example, consider a scenario in which target datastore D has a disk pool of five pre-copied disks, but the clone request asks for ten clones. In this case, the disk pool agent at host system H can carry out a different process that involves, e.g., moving four pre-copied disks from the disk pool to the VM home folders of four clones, while leaving one pre-copied disk in the disk pool. Then for the remaining six clones, the disk pool agent can create, on demand, six new copies of virtual disk 114 from the one remaining copy in the disk pool and move these newly created copies to the VM home folders of those six clones. In these embodiments, as part of creating the new local copies, the disk pool agent can leverage the read-once optimization mentioned previously in order to read the data blocks of the remaining copy once and split/replicate those read data blocks to the six destination disks.

Alternatively, if target datastore D does not have a sufficient number of pre-copied disks to fulfill the clone request but one or more other datastores in cluster 104 can make up for some or all of this deficiency, VI management server 102 can intelligently parallelize the cloning process across all of those datastores in order to consume the pre-copied disks available there. In this way, VI management server 102 can minimize or avoid the need for any local copying.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless of the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. On a network environment comprising a management server having a disk pool manager, and a plurality of cluster host environments wherein each cluster host environment comprises a disk pool agent, a method comprising:
   receiving, by a management server, a registration request for registering a virtual machine (VM) or VM template as a source for future VM cloning operations, wherein the VM or VM template is associated with a virtual disk, and wherein the registration request includes a content distribution policy specifying one or more datastores in a cluster and a desired number of copies of the virtual disk to be created in a disk pool of each of the one or more datastores;
   identifying, by the disk pool manager, a subset of the plurality of host systems in the cluster with access to the one or more datastores; and
   transferring, by the disk pool manager, a seed copy of the virtual disk to each of the subset of the plurality of host systems, and
   operating the seed copy of the virtual disk by a hardware processor of each respective host system of the subset of the plurality of host systems, wherein operating the seed copy for each subset of host systems includes storing the seed copy in a disk pool of a datastore in the one or more datastores and creates, using the seed copy, a plurality of additional local copies of the virtual disk in the disk pool for the respective host system;
   for each disk pool agent:
   iteratively comparing, by the respective disk pool agent, a number of available copies in a disk pool, for the respective cluster host environment, to a minimum threshold number specified in a content distribution policy template;
   wherein if the number of available copies in a disk pool for the respective cluster host environment is less than a minimum threshold number:

notifying the management server of the identified respective cluster host environments need for additional clones of the seed copy; and coordinating, by the disk pool manager, for sending of additional clones to the identified cluster host environment from other host environments associated with the one or more data stores.

2. The method of claim 1 further comprising, subsequently to the transferring:

receiving a clone request for creating k clones of the VM or VM template;

identifying a target datastore in the one or more datastores holding at least k copies of the virtual disk in its disk pool;

identifying a host system with access to the target datastore; and sending a clone command to the host system with instructions for moving the k copies from the disk pool of the target datastore to VM home folders of the k clones.

3. The method of claim 1 wherein the seed copy is transferred to each of the one or more host systems using a network multicast protocol.

4. The method of claim 1 wherein the transferring of the seed copy to each of the one or more host systems comprises reading the virtual disk exactly once.

5. The method of claim 1 wherein said each host system creates the one or more additional local copies by reading the seed copy exactly once.

6. A non-transitory computer readable storage medium comprising nonvolatile memory having stored thereon program code executable by a computer system, the program code embodying a method comprising:

receiving, by a management server, a registration request for registering a virtual machine (VM) or VM template as a source for future VM cloning operations, wherein the VM or VM template is associated with a virtual disk, and wherein the registration request includes a content distribution policy specifying one or more datastores in a cluster and a desired number of copies of the virtual disk to be created in a disk pool of each of the one or more datastores;

identifying, by the disk pool manager, a subset of the plurality of host systems in the cluster with access to the one or more datastores; and transferring, by the disk pool manager, a seed copy of the virtual disk to each of the subset of the plurality of host systems, and operating the seed copy of the virtual disk by a hardware processor of each respective host system of the subset of the plurality of host systems, wherein operating the seed copy for each subset of host systems includes storing the seed copy in a disk pool of a datastore in the one or more datastores and creates, using the seed copy, a plurality of additional local copies of the virtual disk in the disk pool for the respective host system;

for each disk pool agent:

iteratively comparing, by the respective disk pool agent, a number of available copies in a disk pool, for the respective cluster host environment, to a minimum threshold number specified in a content distribution policy template;

wherein if the number of available copies in a disk pool for the respective cluster host environment is less than a minimum threshold number:

notifying the management server of the identified respective cluster host environments need for additional clones of the seed copy; and coordinating, by the disk pool manager, for sending of additional clones to the identified cluster host environment from other host environments associated with the one or more data stores.

7. The non-transitory computer readable storage medium of claim 6 wherein the method further comprises, subsequently to the transferring:

receiving a clone request for creating k clones of the VM or VM template;

identifying a target datastore in the one or more datastores holding at least k copies of the virtual disk in its disk pool;

identifying a host system with access to the target datastore; and sending a clone command to the host system with instructions for moving the k copies from the disk pool of the target datastore to VM home folders of the k clones.

8. The non-transitory computer readable storage medium of claim 6 wherein the seed copy is transferred to each of the one or more host systems using a network multicast protocol.

9. The non-transitory computer readable storage medium of claim 6 wherein the transferring of the seed copy to each of the one or more host systems comprises reading the virtual disk exactly once.

10. The non-transitory computer readable storage medium of claim 6 wherein said each host system creates the one or more additional local copies by reading the seed copy exactly once.

11. A computer system comprising:

a processor; and a non-transitory computer readable medium having stored thereon program code that causes the processor to:

receive a registration request for registering a virtual machine (VM) or VM template as a source for future VM cloning operations, wherein the VM or VM template is associated with a virtual disk, and wherein the registration request includes a content distribution policy specifying one or more datastores in a cluster and a desired number of copies of the virtual disk to be created in a disk pool of each of the one or more datastores;

identify, by a disk pool manager, a subset of the plurality of systems in the cluster with access to the one or more datastores; and transfer a seed copy of the virtual disk to each of the subset of the plurality of host systems, and operating the seed copy of the virtual disk by a hardware processor of each respective host system of the subset of the plurality of host systems, wherein operating the seed copy for each subset of host systems includes storing the seed copy in a disk pool of a datastore in the one or more datastores and creates, using the seed copy, a plurality of additional local copies of the virtual disk in the disk pool for the respective host system;

for each disk pool agent:

iteratively comparing, by the respective disk pool agent, a number of available copies in a disk pool, for the respective cluster host environment, to a minimum threshold number specified in a content distribution policy template;

wherein if the number of available copies in a disk pool for the respective cluster host environment is less than a minimum threshold number:

notifying the management server of the identified respective cluster host environments need for additional clones of the seed copy; and coordinating, by the disk pool manager, for sending of additional clones to the identified cluster host environment from other host environments associated with the one or more data stores.

12. The computer system of claim 11 wherein the program code further causes the processor to, subsequently to the transferring:

receive a clone request for creating k clones of the VM or VM template;

identify a target datastore in the one or more datastores holding at least k copies of the virtual disk in its disk pool;

identify a host system with access to the target datastore; and send a clone command to the host system with instructions for moving the k copies from the disk pool of the target datastore to VM home folders of the k clones.

13. The computer system of claim 11 wherein the seed copy is transferred to each of the one or more host systems using a network multicast protocol.

14. The computer system of claim 11 wherein the transferring of the seed copy to each of the one or more host systems comprises reading the virtual disk exactly once.

15. The computer system of claim 11 wherein said each host system creates the one or more additional local copies by reading the seed copy exactly once.

* * * * *